United States Patent [19]

Du

[11] Patent Number: 6,052,684

[45] Date of Patent: Apr. 18, 2000

[54] SYSTEM AND METHOD FOR PERFORMING CONSISTENT WORKFLOW PROCESS EXECUTION IN A WORKFLOW MANAGEMENT SYSTEM

[75] Inventor: Weimin Du, San Jose, Calif.

[73] Assignee: Hewlett-Packard Company, Palo Alto, Calif.

[21] Appl. No.: 09/046,967

[22] Filed: Mar. 24, 1998

[51] Int. Cl.[7] .................................................. G06F 17/31
[52] U.S. Cl. ................................................ 707/8; 707/9
[58] Field of Search ................................. 707/8, 1, 104, 707/103, 102, 9, 28, 201

[56] References Cited

U.S. PATENT DOCUMENTS

| | | | |
|---|---|---|---|
| 5,301,320 | 4/1994 | McAtee et al. | 705/9 |
| 5,680,530 | 10/1997 | Selfridge et al. | 345/440 |
| 5,721,943 | 2/1998 | Johnson | 713/300 |
| 5,799,297 | 8/1998 | Goodridge et al. | 707/1 |
| 5,826,239 | 10/1998 | Du et al. | 705/8 |
| 5,870,545 | 2/1999 | Davis et al. | 709/201 |
| 5,893,906 | 4/1999 | Daffin et al. | 705/28 |
| 5,937,388 | 8/1999 | Davis et al. | 705/8 |
| 5,960,420 | 9/1999 | Leymann et al. | 707/1 |

OTHER PUBLICATIONS

Sheth et al., "On Transactional Workflows", vol. 16(2), pp. 37–40, IEEE.

Tang et al. "Transaction–Oriented Work–Flow Concepts in Inter–Organizational Environments", 1995, pp. 250–259, CIKM, 1995, Baltimore MD USA, ACM.

Georgakopoulos et al, "A Framework for Enforceable Specifications of Extended Transaction Models and Transactional Workflows", 1994, vol. 3(3), pp. 225–253, Intl. J. of intelligent & Cooperative Info. Systems.

Alonso et al., "Advanced Tranaction Models in Workflow Contexts", 1994, pp. 574–581, IEEE.

Primary Examiner—Anton W. Fetting
Assistant Examiner—Sanjiv Shah
Attorney, Agent, or Firm—Thomas X. Li

[57] ABSTRACT

A system for allowing consistent execution of a workflow process in a computer-enabled workflow management system is described. The workflow process includes at least one sequence of workflow actions, having at least one set of parallel workflow actions and being configured as a number of nodes interconnected by arcs. Each node defines and executes at least one of the workflow actions. The system includes a workflow process database accessible by the nodes of the workflow process to read and write data items when executing the workflow actions. The system also includes a module for maintaining execution consistency among the workflow actions when the nodes access the workflow process database to read and write the data items in carrying out the workflow actions. A computer-implemented method for consistently executing a workflow process in a workflow management system is also described.

8 Claims, 10 Drawing Sheets

SYSTEM AND METHOD FOR PERFORMING CONSISTENT WORKFLOW PROCESS EXECUTION IN A WORKFLOW MANAGEMENT SYSTEM

BACKGROUND OF THE INVENTION

1. Field of the Invention

The present invention pertains to workflow process management. More particularly, this invention relates to a system and method for performing consistent and efficient workflow process execution in a workflow process management system.

2. Description of the Related Art

Workflow process re-engineering is the fundamental rethinking and re-implementation of workflow processes to achieve levels of quality, cost, throughput and service that have not been accomplished before. Workflow process management (WFPM) software, or more accurately, middleware, provides the enabling technologies for actually performing workflow process re-engineering. WFPM supports flexible solutions for the management of enterprise-wide operations, including workflow process control, automation and monitoring, resource allocation, authorization and authentication, task initialization and data exchange, and end-to-end communication and security.

WFPM can also be used to perform a wide range of tasks. For example, WFPM systems can manage existing non-automated legacy or work processes. As another example, WFPM systems can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Workflow process execution should be correct, efficient and flexible. In addition, workflow process execution should also be consistent. Workflow processes involve coordinated execution of activities performed by workflow resources (e.g., a person, a computer-based application, or an instrument). Workflow process execution involves accessing data items both internal and external to the workflow engine. Internal data items of each process execution is stored in a separate workflow process database that is managed by the workflow engine. External data items are stored in multiple action databases that are managed by external database management systems and are accessible by workflow activities, but not accessible by the workflow engine. The state of a workflow system is defined by the values of all data items involved in workflow process executions. A workflow system state is consistent if data items accessed and managed by different systems represent the same view of real world. For example, in a product design workflow system, the status of product design in the workflow process database managed by the workflow engine (for routing) should be consistent with that in the action database managed by external design system. A workflow process execution is consistent if each individual step sees a consistent workflow system state.

A prior solution for ensuring workflow process consistency is to adopt the concurrency control protocols used by database management systems. This solution executes each of the workflow activities as ACID transactions and employs concurrency control protocols such as two-phase locking to prevent undesired interaction among parallel activities. The approach ensures serializable execution of workflow activities.

One problem associated with this prior approach is that it requires sequential execution of parallel but conflicting workflow activities. While sequential execution of conflicting database operations (e.g., read and write) is acceptable, sequential execution of conflicting workflow activities is not acceptable, as they are generally long running.

In addition, serializability is not really needed in many workflow applications. This is the case not only because serializability is too costly to ensure, but also because the meaning of consistency in workflow is different from that in the database. In many workflow systems, a process execution is consistent if the data seen by the workflow engine is consistent with that seen by external workflow applications. Serializability is sufficient, but not necessary to ensure this level of consistency.

Thus, there is a need for a system and method for maintaining different levels of consistency and allowing concurrent execution of workflow activities.

SUMMARY OF THE INVENTION

One feature of the present invention is to allow high degree of concurrency and consistency in a workflow process.

Another feature of the present invention is to provide a coordination protocol that is flexible to meet different consistency requirements (e.g., for parts of or the entire workflow system).

A further feature of the present invention is to provide a coordination protocol that ensures virtual isolation by atomic read and write steps.

A system for allowing consistent execution of a workflow process in a computer-enabled workflow management system is described. The workflow process includes at least one sequence of workflow actions, having at least one set of parallel workflow actions and being configured as a number of nodes interconnected by arcs. Each node defines and executes at least one of the workflow actions. The system includes a workflow process database accessible by the nodes of the workflow process to read and write data items when executing the workflow actions. The system also includes a module for maintaining execution consistency among the workflow actions when the nodes access the workflow process database to read and write the data items in carrying out the workflow actions while maintaining concurrency among the workflow actions.

The module implements an atomic read/write coordination protocol. The protocol prevents workflow actions from reading partial results of other workflow actions by implementing their read and write steps as two separate but atomic operations, thus ensuring very high concurrency degree.

A computer-implemented method for consistently executing a workflow process in a workflow management system is also described. The workflow process includes a plurality of interconnected nodes which carry out multiple associated workflow actions including at least one set of parallel actions. The method includes the step of allowing each of the nodes to read and write data items to and from the workflow process database in carrying out the workflow actions associated with the respective nodes of the workflow process. The method also includes the step of maintaining execution consistency among the workflow actions when the nodes access the workflow process database to read and write the data items in carrying out the workflow actions.

Other features and advantages of the present invention will become apparent from the following detailed description, taken in conjunction with the accompanying drawings, illustrating by way of example the principles of the invention.

DETAILED DESCRIPTION OF THE INVENTION

According to one embodiment of the present invention, a coordination scheme is provided to allow consistent execution of a workflow process (e.g., the workflow process 18) in a workflow process management system (i.e., the system 10). The workflow process includes at least one sequence of workflow actions, having at least one set of parallel workflow actions and being configured as a number of nodes interconnected by arcs. Each node defines and executes at least one of the workflow actions. In carrying out the workflow actions, the nodes accesses a workflow process database (e.g., the workflow process database 20a) to read and write data items.

The coordination scheme allows consistent execution among the workflow actions by allowing each node to access the workflow process database in atomic read and write steps while still allowing concurrent execution of the workflow actions. This ensures virtual isolation among the workflow actions.

During an atomic read operation, the node first obtains the read locks for the data items it needs to read from the workflow process database if the data items are not locked for write by other nodes. Otherwise the node waits until the write locks are released. The node then reads the data items and releases all the read locks.

During an atomic write operation, the node first obtains the write locks for the data items to be written into the workflow process database if the data items are not locked by other nodes for read or write operation. Otherwise, the node waits until the locks of the data items are released. The atomic write only writes the data items back to the workflow process database if the data items were not previously updated by another activity transaction that has accessed the same action database with a greater serialization order. Atomic read and write operations guarantee that each workflow action sees the entire execution results of other workflow actions.

Workflow Process Management System

Figure 1:
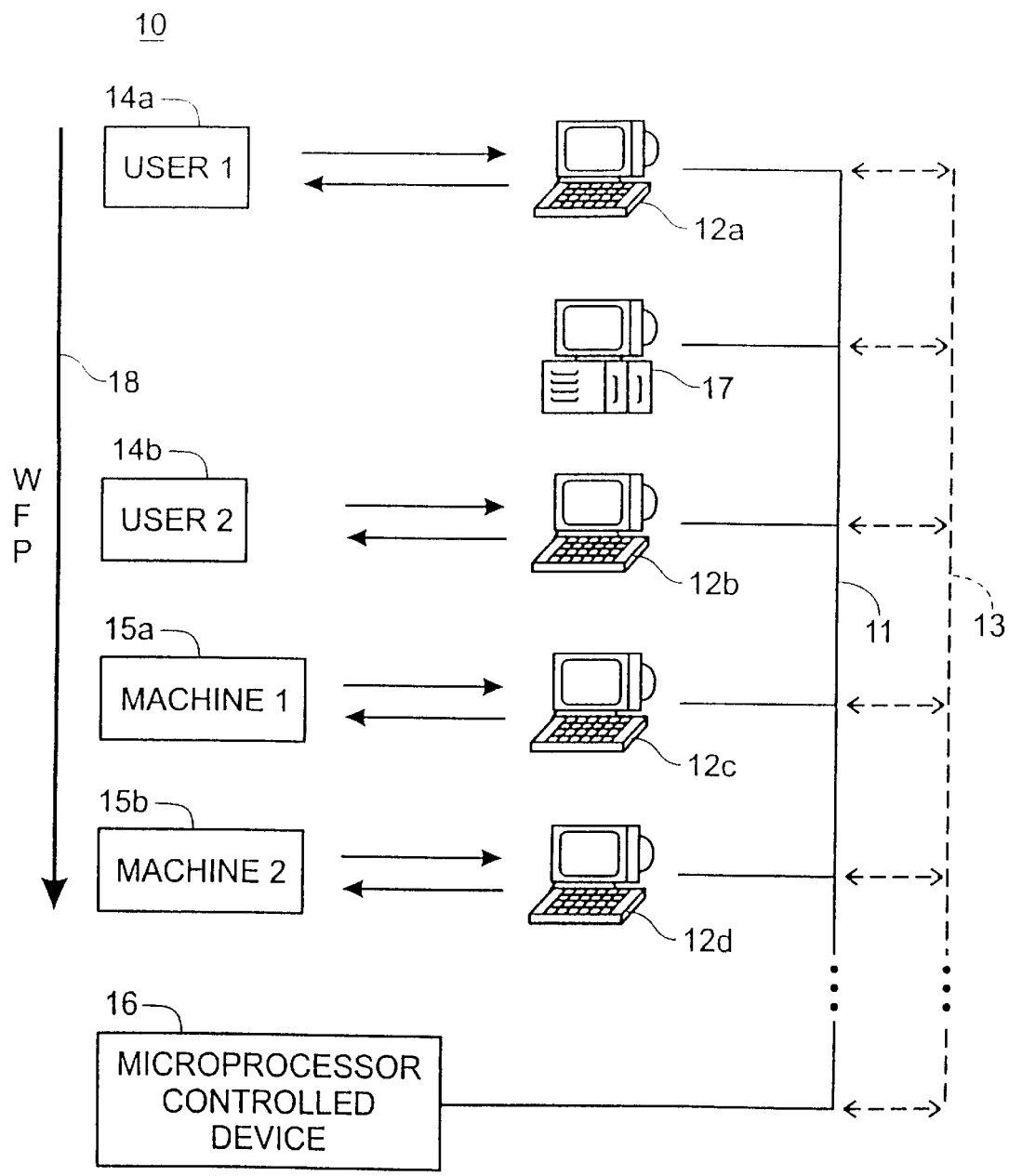
FIG. 1 is a block diagram of a process flow management system implemented in a network of computers coupled to a plurality of users and machines for management and control of workflow process activities.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d.

Each workflow process 18 includes a sequence of activities or actions, each of which can be performed by one of the computer systems 12a–d in conjunction with an associated user 14a–b or machine 15a–b, although some activities can be performed by microprocessor-controlled devices 16 (only one is shown in FIG. 1), such as a telephone or facsimile machine, printing device or similar self-controlling mechanism. In addition, each of the machines 15a–b can be a work instrument or computer resource.

The workflow process 18 can span several business organizations (only one is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (example shown in FIG. 3) which provides the operational "glue" and environment support needed by the WFPM system 10 for managing and automating the workflow process 18, recovering from failures and enforcing consistency. As further described herein below, the WFPM system 10 also enforces various administrative policies associated with resources and work.

HP OpenPM

Figure 2:
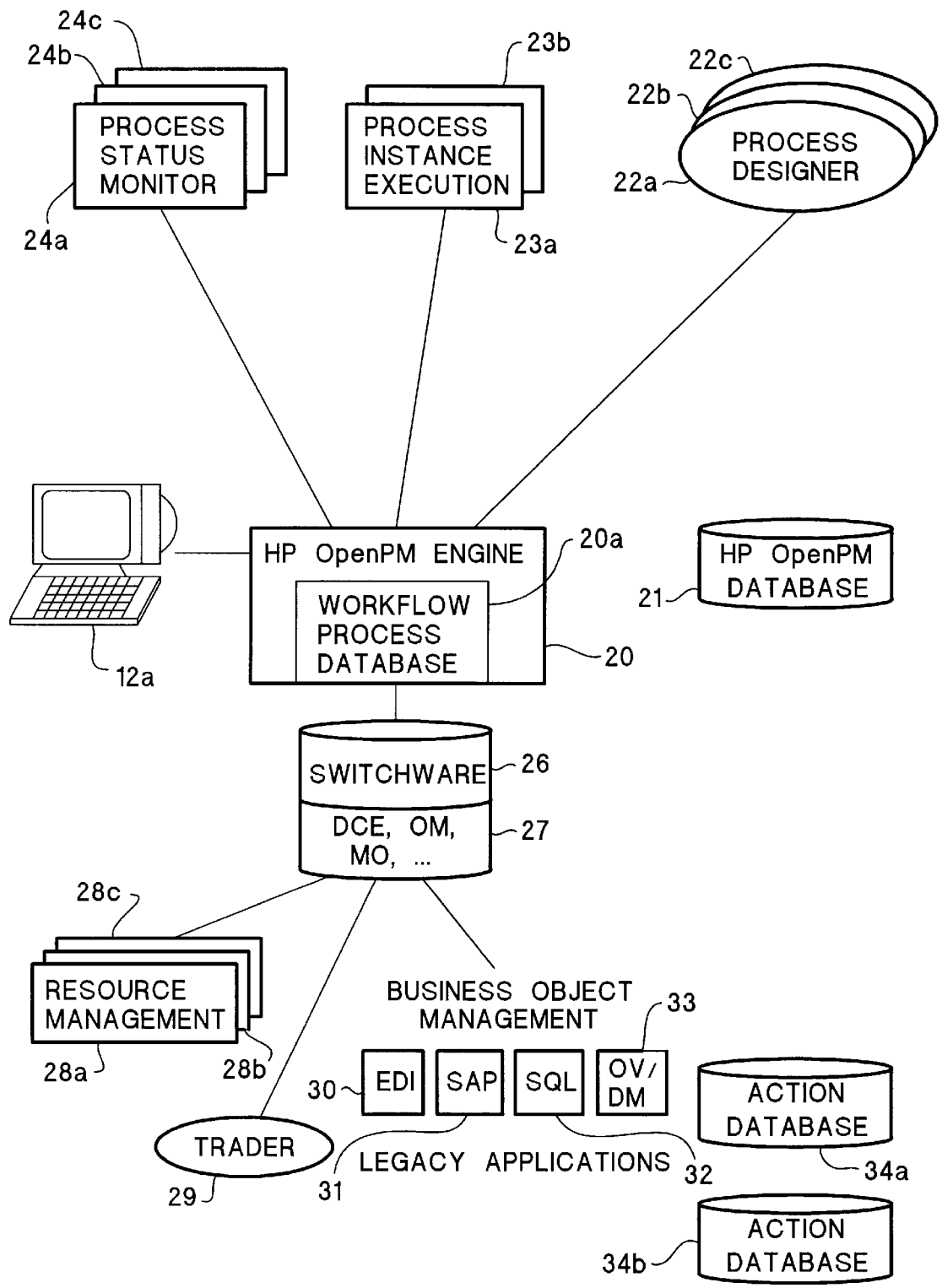
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WFPM middleware employing the present invention. An example of middleware suitable for implementing the present invention is the Hewlett Packard (HP) OpenPM system. HP OpenPM is an open, enterprise-capable, object-oriented WFPM system developed by Hewlett Packard Co., Palo Alto, Calif., for managing process activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

The overall architecture of the HP OpenPM system is depicted in FIG. 2. The core is the HP OpenPM engine 20, which supports five interfaces. The interfaces enable the HP OpenPM engine 20 to interact with workflow process designer 22a–c, workflow process instance execution 23a–b, workflow process monitor 24a–c, workflow management 28a–c and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

The workflow process 18 is specified by the process design modules 22a–c via the workflow process definition interface. A workflow process database 20a is used for storing data items for carrying out the workflow process 18. The workflow process database 20a is accessible by the HP OpenPM engine 20. An instance of the workflow process 18 can be started, controlled or stopped by the process instance execution modules 23a–b via the process execution interface. Status information of each process instance and load information for the WFPM system 10 can be queried using the process status monitor modules 24a–c via the process status monitoring interface. The workflow management interface is used to allocate, at run time, execution resources to a task, according to the policies defined by the organization (including authorization and authentication) and the availability of the resources using the workflow management modules 28a–c. Interaction with the external world, such as invoking an application or action, controlling an instrument or delivering a work order to a person's electronic mail in-box, is performed by the various business object management modules 30, 31, 32, 33.

HP OpenPM Process Model

A workflow process is described as a directed graph P=<N, A> comprising a set of nodes N={$n_1$, $n_2$, . . . }, and a set of arcs A¥$N^2$ connecting nodes in N.

Figure 3:
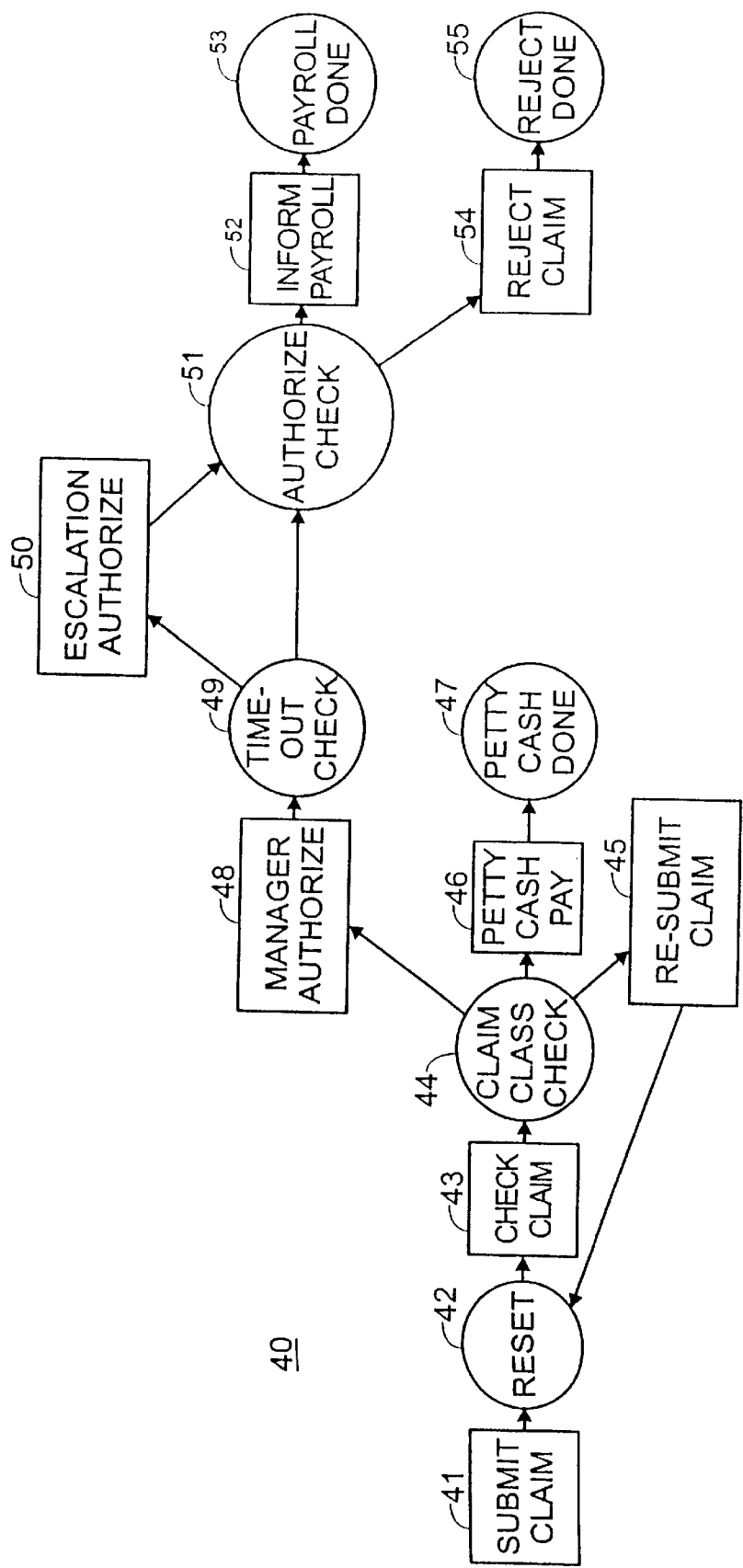
FIG. 3 is a computer display of the user interface for the user of the machine of FIG. 2 to interact with the process flow management system, the display showing an example of a process flow diagram.

In general, a workflow process 18 is a description of the sequencing, timing, dependency, data, physical agent allocation, business rule and organization policy enforcement requirements of process activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in the workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects and provision of input data for the business objects and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of the process 18. A process activity is mapped to the invocation of an operation on business objects during the execution of the process and each process activity can represent a manual operation by a human or a computerizable task to execute legacy applications 30, 31, 32, 33 (shown in FIG. 2), access action databases 34a, 34b (also shown in FIG. 2), control instrumentation, sense events in the external world or effect physical changes. A process activity definition includes a forward activity and optionally, a compensation activity, a cancel activity, a workflow management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process, there is a workflow process database defined by a workflow process designer module 22a (shown in FIG. 2). For example, the workflow process data base 20a is provided for the workflow process 18. The process database is used to provide initial data for the creation of process instances. At run time, based on the process database template and read/write lists of activities defined in the workflow process (e.g., the process 18), HP OpenPM will generate a workflow process database (e.g., the workflow process database 20*a*) for each process instance to facilitate data passing between activities and the HP OpenPM engine 20.

HP OpenPM Process Execution

Figure 4:
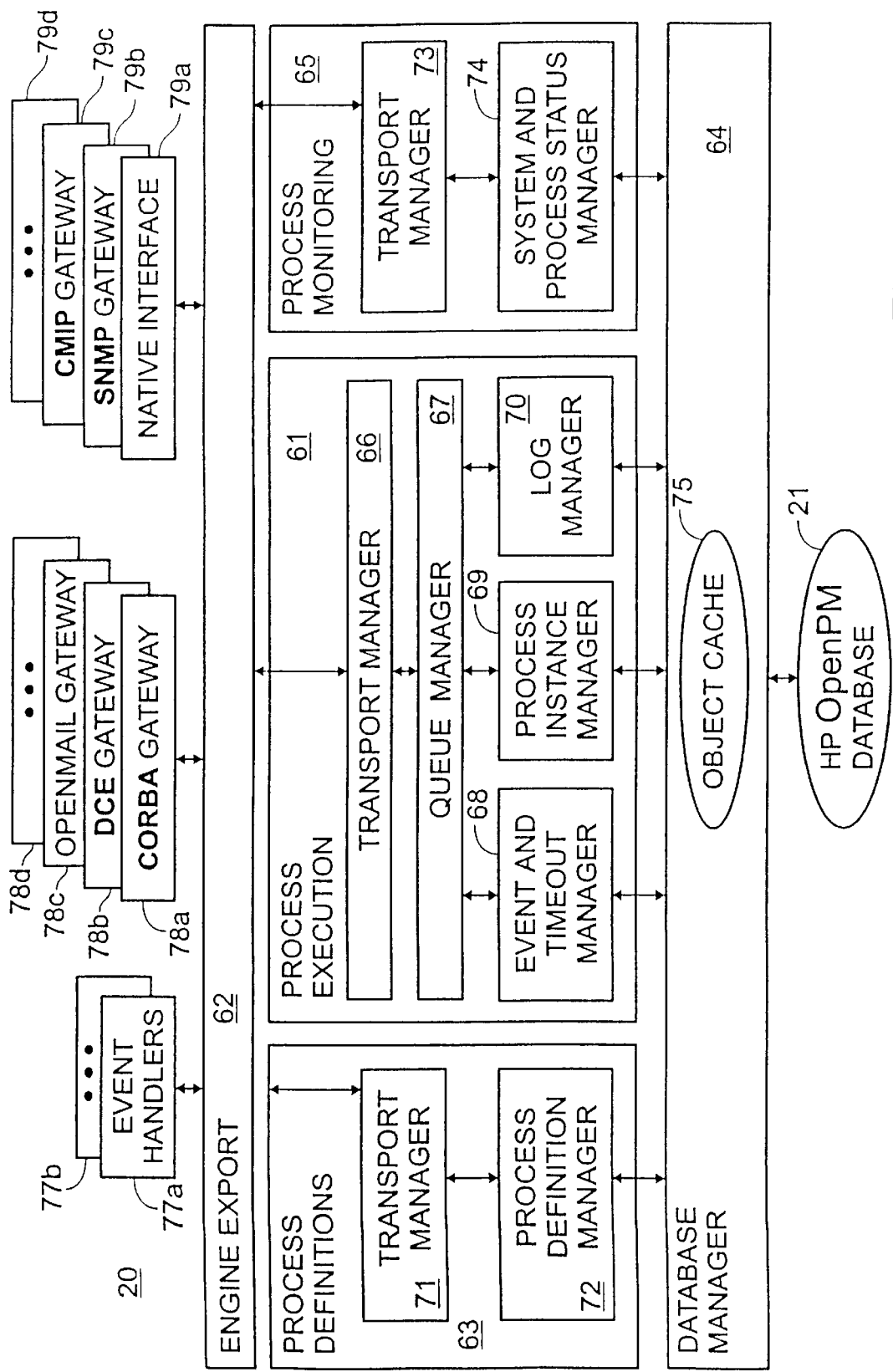
FIG. 4 is a block diagram of the preferred form of workflow process software engine that coordinates execution flow of the managed process.

FIG. 4 is a block diagram of the preferred form of a workflow process software engine, such as the HP Open PM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a process activity failure. In addition, the HP OpenPM engine 20 allows flexible specification of compensation scopes and actions, such as compensation activity or cancel activity, to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running process activities and support system management, the HP OpenPM engine 20 maintains a comprehensive log of all events using a log manager 70 and provides a native interface 79*a* as well as an SNMP 79*b* and CMIP 79*c* gateways to facilitate integration with the HP OpenView environment. The formats and contents of the logged information can be customized to support specific application needs.

Each workflow process execution is associated with a data structure (i.e., the workflow process database) which is a list of process specific and process relevant data used by the workflow engine. As described above, the HP Open PM engine 20 includes the workflow process database 20*a* for the workflow process 18. The workflow process database is shared by all work and rule nodes. A work node accesses the workflow process database in two phases. First, it reads data items from the container when it starts execution and passes the data to the associated workflow activity as input parameters. Then, after the activity execution completed and returned, it writes the execution results back into the workflow process database, making them available to subsequent nodes. A rule node may read data items in the container for rule evaluation. It may also update data items in the, workflow process database as rule actions.

Consistency Requirements

Consider two activities of a workflow process, there are four cases with respect to their data dependencies.

1. They do not access common data items.
2. There is a static data flow from on activity to the other. In other words, execution of one activity requires results produced by the other activity and the data flow is pre-specified.
3. There is a dynamic data flow between the two activities. In other words, the two activities have to be run one after the other, so that the latter can use the results produced by the former, but the order of the execution (i.e., the direction of the data flow) is not important and thus not pre-specified.
4. There is no data flow between the two activities, even though they access common data items. In other words, the execution of one activity does not require the results produced by the other, and thus they can be run in parallel.

There is no consistency issue in the first case, as the two activities do not conflict with each other. In the second case, the data flow is explicitly specified using arc between the two activities to enforce the execution order. In the third case, serializable execution is necessary and can be ensured using traditional database concurrency control protocols (e.g., two-phase locking) or other similar protocols (referred to as pre-locking protocol). This invention deals with the last case wherein there is no data flow between the two activities, even though they access common data items.

Figure 5:
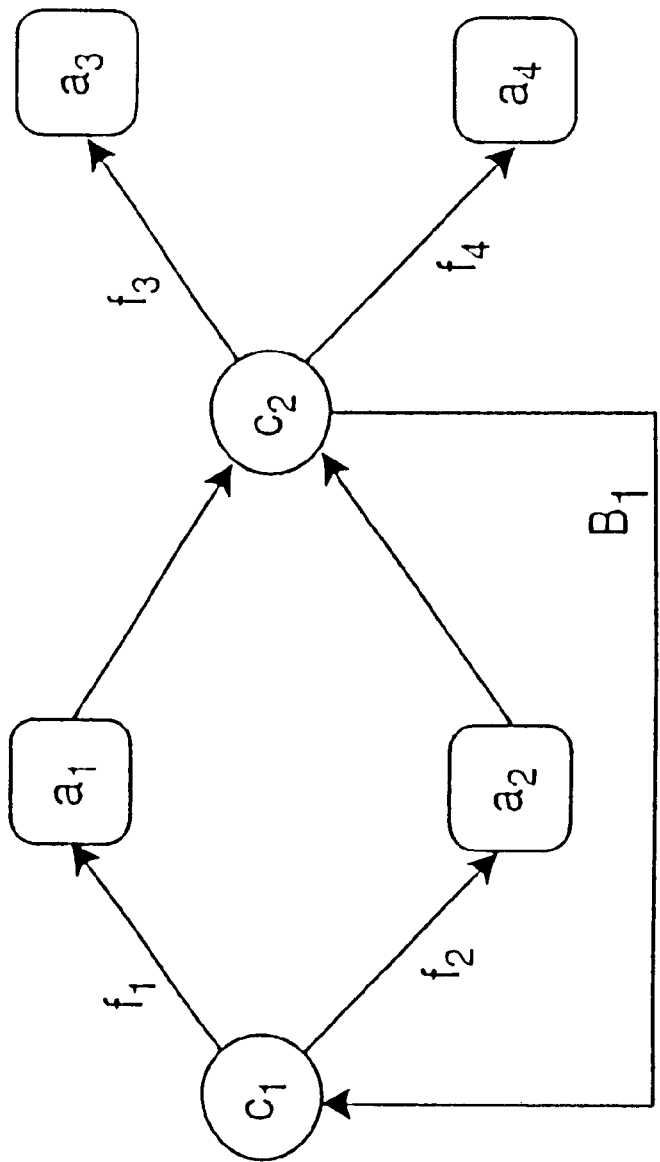
FIG. 5 is a diagram similar to FIG. 3, showing an example of product-design process flow specification in which potential transaction activity conflicts are alleviated by using workflow process consistency according to the invention.

Consider an example of a product design project which consists of two major components: a mechanic component and an electronic component, for which two design groups located in different locations are responsible. FIG. 5 shows a possible workflow process specification for the design. The two groups (modeled as two work nodes $a_1$ and $a_2$ in FIG. 5) start by getting the list of required changes (i.e., reading from the process database), and then work in parallel. Each group will finish the required changes to the design and check in the new design into a well known document database (i.e., the action database), by merging it with the other component design in the action database.

After checking in the design, each design group sends back to the workflow engine the status of the overall product design, as well as a list of possible further changes, to be stored into the process database for the project manager to review. From a design group's point of view, the overall product design is COMPLETE if it finishes its design, successfully merges it with the other component design, and requires no further changes. Otherwise, the design is considered to be INCOMPLETE.

The project manager (modeled as rule node c1), after checking the design status in the process database, will decide to either release the design to the manufacture team (modeled as work nodes a3 and a4 in FIG. 5) if it is complete, or ask the design groups to continue the work (loop back to c1 in FIG. 5) if the design is incomplete or there are new required changes.

From the project manager's point of view, it is important to keep the design status in the process database (e.g., the process database 20*a*) consistent with that in the action database (e.g., the action database 34*a* or 34*b*). The workflow engine (e.g., the engine 20) is used to ensure the consistency. Note that the two activities conflict with each other as they both read (from the process database) the required changes and update (to both the process database and the action database) the design status and required changes.

Using traditional database concurrency control protocols (e.g., two-phase locking), two activities would have to access the process database sequentially to ensure serializability. Sequential accesses to the process database also implies sequential access to the action database, thus guaranteeing that two activities update the process database in the same order as they update the action database. Sequential scheduling is clearly undesirable as it slows down the overall design process. As will be described below, sequential scheduling is sufficient but not necessary.

On the other hand, non-sequential scheduling is not trivial. Simply let them run concurrently may leave the process database out of synchronization with the action databases, as two activities may update the process database in a different order as they update the action database. For example, the mechanic design group may complete its design first but require some further changes and thus returns incomplete status. The electronic design group may then finish its design (including all the required changes from the mechanic design group) without requiring any new changes. The overall product design (as reported by the electronic design group) is clearly complete. But the status report from the mechanic design group may arrive at the workflow engine after that from the electronic design group. Workflow engine cannot blindly updates the process database according to the order each activity replies.

The above design process has the following characteristics. The two component design activities need to be done in parallel (to speed up the design process). The two activities access common external data items (e.g., design documents) in the action database and internal data items (e.g., design status) in the process database. The two activities are independent and thus can be performed in any order. But the actual order in which the design document is updated is significant for the rest of design process.

In order to support the above design process, the workflow management system should be able to do the following:

Allow concurrent executions of workflow activities even if they access common (internal or external) data items; and Make sure that the internal process database (e.g., design status) and external action database (e.g., design documents) are updated in a consistent fashion.

Given a workflow process execution P, we use D(P) to denote the set of all data items (in both the process and the action databases) P accesses, and $D_i(P)$ to denote the process database of P. An execution P is virtually isolated if for all $i_1, i_2 \in P$ the following conditions are met:

1. Action database access is serializable;
2. For all a, b$\in$D(P), $w_1(a)$, $w_1(b)\in i_i$, and $w_2(a)$, $w_2(b)\in i_2$, $w_1(b)$ precedes $w_2(b)$ if $w_1(a)$ precedes $w_2(a)$; and
3. For all a, b$\in D_i(P)$, $w_i(a)$, $w_1(b)\in i_1$, and $r_2(a)$, $r_2(b)\in i_2$, $w_1(b)$ precedes $r_2(b)$ if $w_1(a)$ precedes $r_2(a)$.

The second condition in the definition ensures that all data items (including those in the workflow process database) are updated in a consistent order. The third condition ensures that no activity transaction sees the partial execution results of other transactions. It is, however, possible for two interleaving and conflicting transactions to not read from each other. The idea is to allow two activities to read the same value of the workflow process database and then perform independently. The execution results will be written back into the workflow process database. Note that the third condition only prevents undesired write-read conflicts on data items in the workflow process database. The assumption is that concurrent activities do not depend on each other via data. Therefore, either there are no write-read conflicts on data items in the action database or such conflicts will not affect the consistency and can be ignored.

In the product design example, let us use d to represent the design document in the action database, $s_i$ and $s_e$ to represent design status in the workflow process and action databases, respectively, and $c_i$ and $c_e$ to represent required changes in the databases, respectively. Both nodes $a_i$ and $a_2$ read $s_i$, $c_i$, then update d, $s_e$ and $c_e$, and finally update $c_i$ and $s_i$. Consider the following execution of nodes $a_1$ and $a_2$:

$E_0$: $r_1(s_i)r_1(c_i)r_2(s_i)r_2(c_i)w_2(d)w_2(s_e)w_2(c_e)w_1(d)w_1(s_e)w_1(c_e)w_2(s_i)w_2(c_i)w_1(s_i)w_1(c_i)$.

In the execution, the two activities were started at about the same time. They got the same initial design status from the workflow process database and then started their designs independently. Node $a_2$ finished the design first and checked in its design to the database, followed by node $a_1$. They both returned to the workflow engine with their views of the overall product design. The two activities update the design status ($s_i$) in the workflow process database in the same order as they checked in the designs.

The execution is acceptable according to application semantics, as $s_i$ is consistent with $s_e$, and represents the correct status of d. It is, however, not serializable, but virtually isolated, as nodes $a_1$ and $a_2$ update data (both internal and external) in a consistent order, and they do not see partial execution results of each other.

Compared with serializability, the main relaxation of virtual isolation is to allow two conflicting transactions to read the same workflow process database state and then work independently. This usually implies that one of the transactions may lose part of its execution result in the workflow process database.

For example, the execution result of node $a_2$ is lost in $E_0$ as it is overwritten by node $a_1$. In many workflow applications (e.g., the product design process), this is acceptable, as the lost execution results are not expected to be seen by any other activities. This is the case because the main function of the workflow process database is to represent the action database states for the process flow control. What is most important is that the final version of the workflow process database seen by subsequent nodes represents the latest and consistent view of the external action databases. In our product design process example, the purpose of keeping the design status in the workflow process database is for the process to decide whether the design can be released or whether more work is needed. As long as the design status reflects the consistent and the latest product design, non-serializable executions are acceptable.

Consistent Process Execution

The present invention enables consistent workflow process execution by ensuring execution atomicity of activities of a single workflow process (e.g., the workflow process 18). More specifically, a coordination scheme is used to allow the workflow process 18 to preserve the consistency of workflow environments even if multiple activities (of the same process) have to interleave and update common data items concurrently. The problem is not trivial, as activities access data items both internal and external (i.e., both the workflow process database and the action database) to the workflow engine (e.g., the engine 20) but such accesses are not coordinated by a single management system as in databases. The access to the internal data is managed by the workflow engine while access to the external data is managed by external database systems. Therefore, coordination of internal and external data accesses is needed so that data consistency is maintained but without requiring sequential execution of workflow activities.

In accordance with one embodiment of the present invention, a coordination scheme is used to ensure consistent and yet concurrent execution of a workflow process (e.g., the process 18). The coordination scheme is executed by the WFPM system 10. The coordination scheme allows two conflicting activities of a workflow process to run concurrently, and yet ensures execution consistency of the workflow process. The coordination scheme according to the present invention allows for concurrent execution of conflicting workflow activities and yet does not abort the completed activities. The idea is to take advantage of the special features of a workflow activity when accessing the workflow process database so that conflicting operations can be performed in a more flexible way. This is done by (1) pre-locking all internal data items an activity transaction accesses, (2) reading or updating the workflow process database in atomic steps, and (3) releasing the lock immediately after the read or update operation is completed.

The coordination scheme in accordance with one embodiment of the present invention allows write-read conflicting workflow activities to be executed concurrently while ensuring virtual isolation. The coordination scheme accomplishes this by allowing each activity transaction to access the workflow process database in atomic steps. Since each activity transaction always reads from the workflow process database first and updates it later, the access is implemented as two atomic operations: one for read and one for write. Atomic read and atomic write guarantees that each activity sees the entire execution results of other activities. Inconsistent updates by two activities are resolved by causing the workflow engine (e.g., HP Open PM engine 20) to obtain locks on the data items to be accessed before the access operation is commenced.

The main advantage of this protocol is that activity transactions release the data locks immediately, allowing other transactions to access the data. Activity transactions can be run concurrently, independently of their conflict mode. Therefore, the two design activities in the product design process can be scheduled to run concurrently. The overall execution may not be serializable, but virtually isolated, which is sufficient for the application.

FIG. 6 through FIG. 9 show in block diagram form the coordination scheme which is also referred to as the atomic read and write scheme. As can be seen from FIG. 6, the coordination scheme starts at the step 171. At the step 172, the atomic read step is performed. At the step 173, the scheme causes the associated activity to be executed with the data item. Then the step 174 is executed at which the atomic update step is performed.

Figure 6:
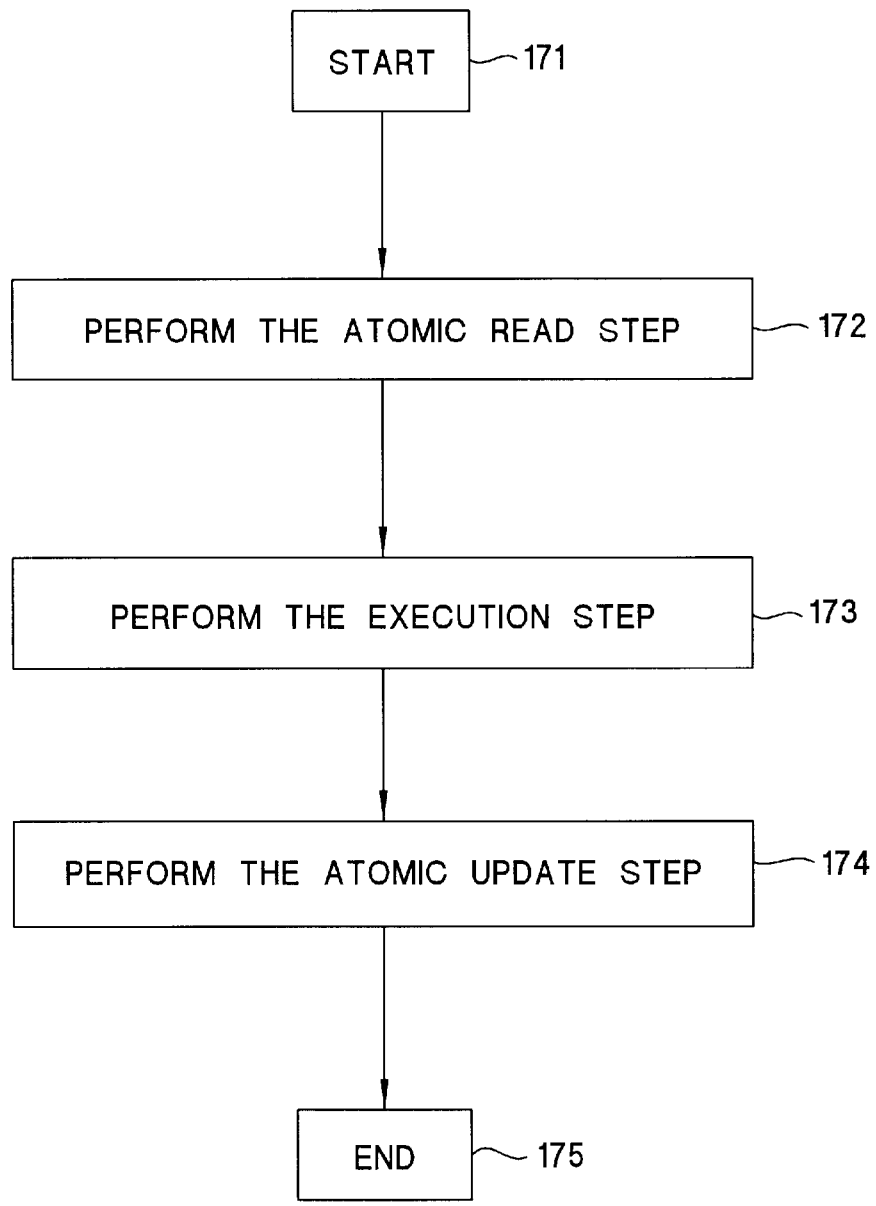
FIGS. 6–9 show the atomic read/write coordination protocol to effect workflow process consistency according to the invention.
Figure 7:
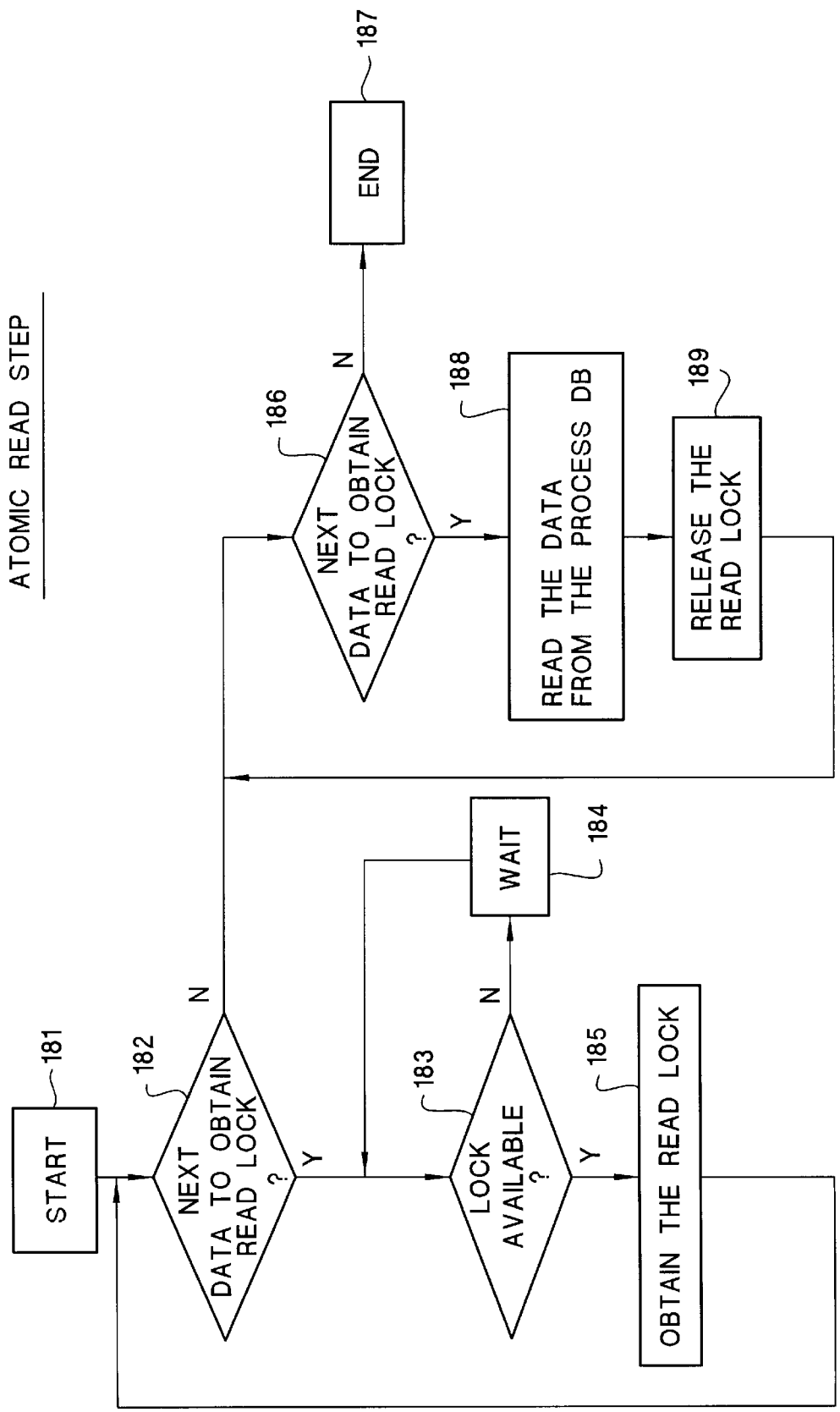

FIG. 7 shows the routine of the atomic read step 172 of FIG. 6. As can be seen from FIG. 7, the routine starts at the step 181. At the step 182, it is determined if there is any data item that needs the read lock. If so, the step 183 is performed. If not, the step 186 is performed.

At the step 183, it is determined if the read lock is available for that data item. If so, the step 185 is performed to obtain the read lock for the data item. The process then returns to the step 182. If, at the step 183, it is determined that the read lock is not available for the data item, then the process waits at the step 184 until the read lock becomes available. As described above, the read lock for that data item is not available to obtain if another activity holds a write lock on that data item.

At the step 186, it is determined if there is any locked data to be read. If so, the process proceeds to the step 188. If not, the process ends at the step 187. At the step 188 the data item is read from the workflow process database and the read lock for that data item is released at the step 189.

Figure 8:
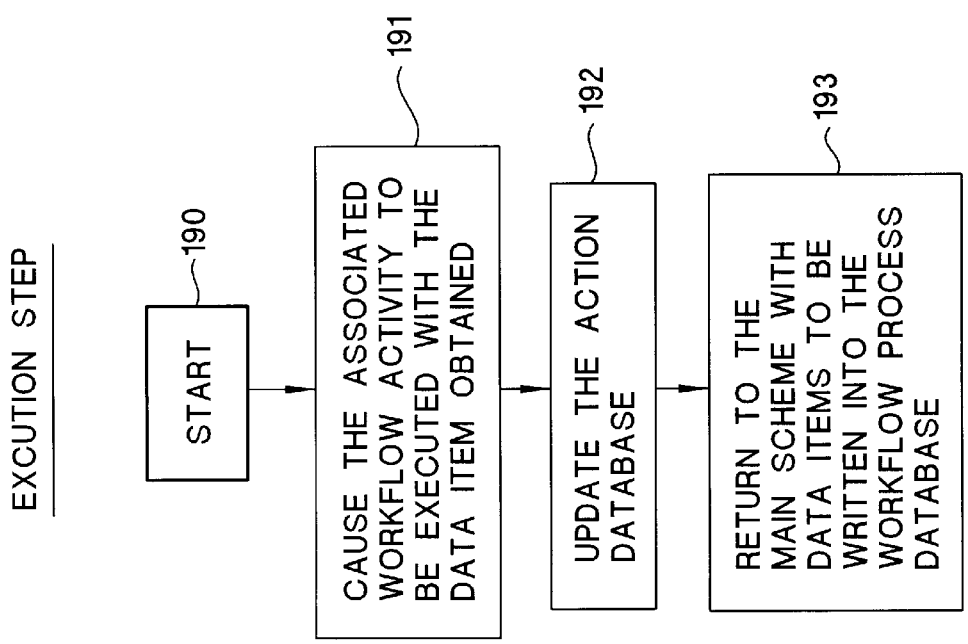

FIG. 8 shows the routine of the execution step 173 of FIG. 6. As can be seen from FIG. 8, the routine starts at the step 190. At the step 191, the associated workflow activity of the node is executed with the data item obtained or read. At the step 192, the action database is updated by the node that executes the associated workflow action. At the step 193, the execution step returns to the main scheme with the returned data item to be written into the workflow process database.

Figure 9:
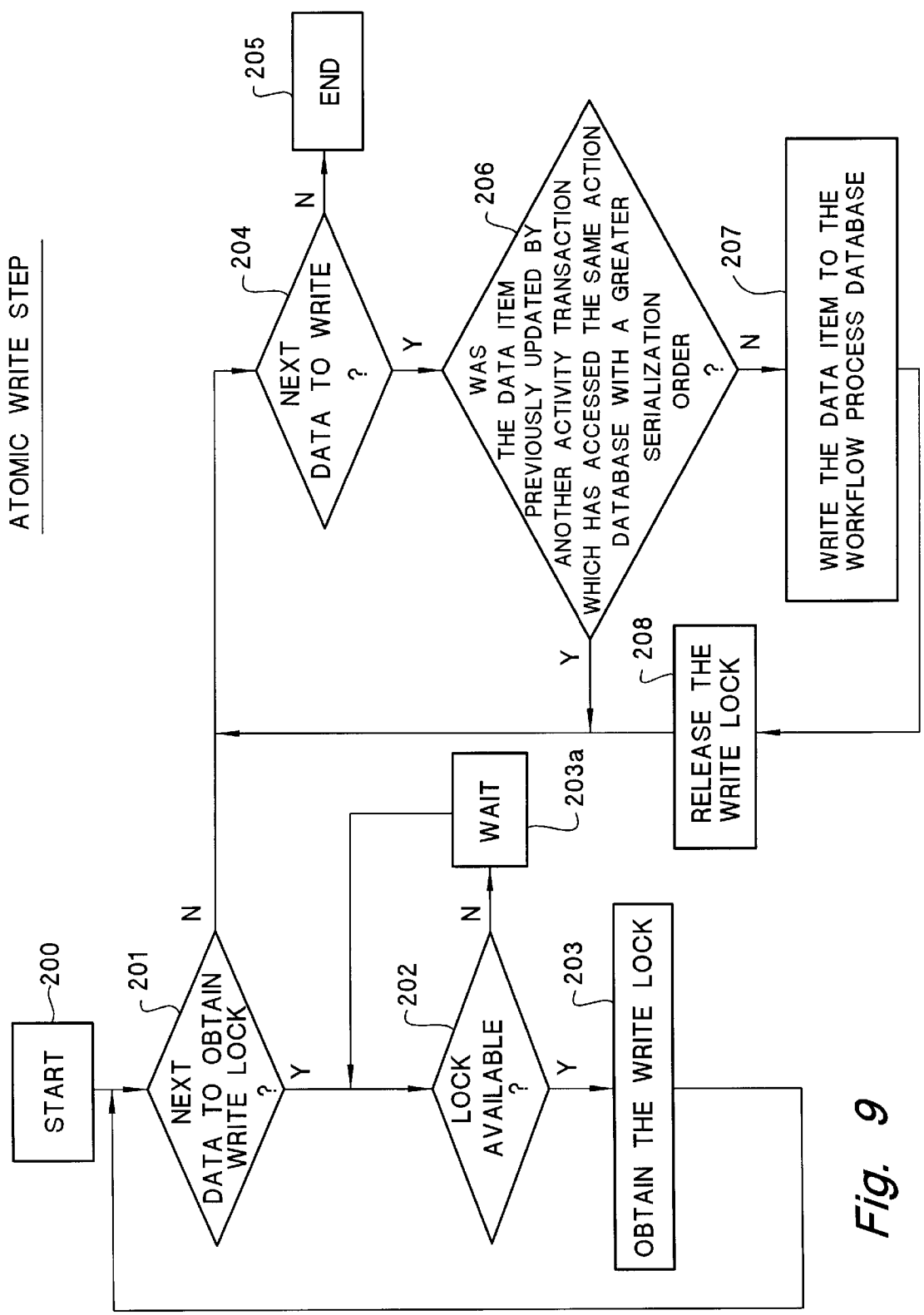

FIG. 9 shows the routine of the atomic write step 174 of FIG. 6. As can be seen from FIG. 9, the atomic write routine starts at the step 200. At the step 201, it is determined if there is any data item that needs the write lock. If so, the step 202 is performed. If not, the step 204 is performed.

At the step 202, it is determined if the write lock is available for that data item. If so, the step 203 is performed to obtain the write lock for the data item. The process then returns to the step 201. If, at the step 202, it is determined that the write lock is not available for the data item, then the process waits at the step 203a until the write lock becomes available. As described above, the write lock for that data item is not available for that data item if other activities hold read or write lock on that particular data item.

At the step 204, it is determined if there is any locked data to be written. If so, the process proceeds to the step 206. Otherwise the process ends at the step 205. At the step 206, it is determined if that data item to be written was previously updated by another activity transaction which has accessed the same action database with a greater serialization order. If so, the data item is ignored and is not updated in the workflow process database. If not, the step 207 is performed to write the data item to the workflow process database and the write lock for that data item is released at the step 208.

Figure 10:
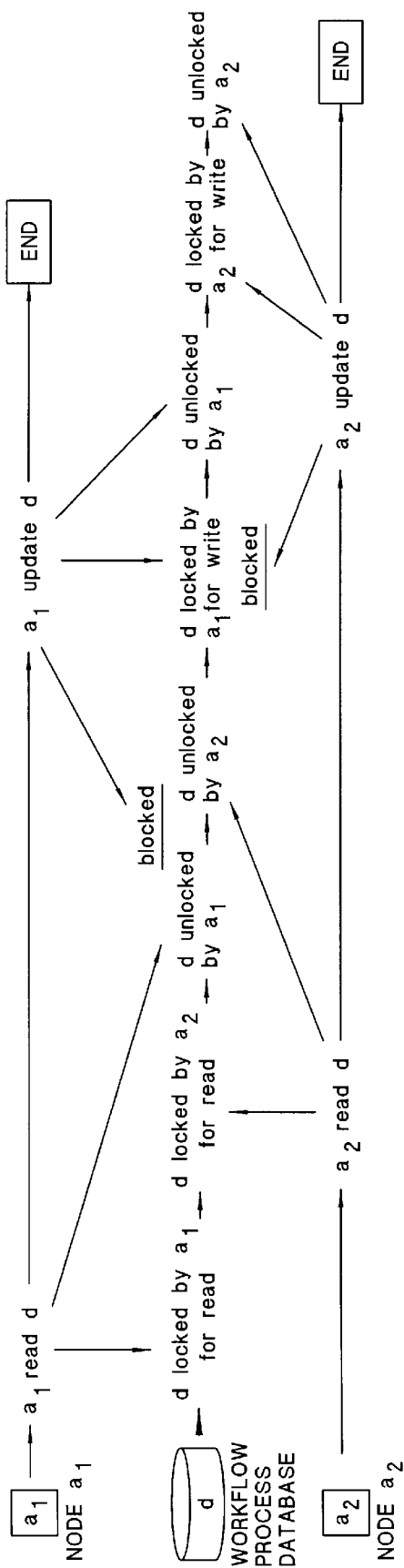
FIG. 10 is a time line diagram showing activities of the parallel nodes of FIG. 5 in accessing the workflow process database under the atomic read-write protocol of the invention.

FIG. 10 diagrams the operation of node $a_1$ and $a_2$ of the above mentioned example, executing and updating the workflow process database under the coordination scheme shown in FIG. 6 through FIG. 9. FIG. 10 shows the operations of the coordination protocol with respect to two parallel work nodes $a_1$ and $a_2$ that both read and write the same data item d, as well as some other data items, in the workflow process database.

Suppose that nodes a1 and a2 were activated at about the same time. They can read d at the same time. In other words, they will both obtain the read locks of d at the same time. However, conflicting operations (read-write, write-read, and write-write) have to be sequentially scheduled.

Suppose that node a1 finished its execution and is ready to update d before a2 finishes reading d. Then a1 will not be allowed to update d while a2 is still holding the read lock of d. Note that a2 will release the read lock immediately after it finishes reading d, allowing a1 to obtain the write lock and updating d. Similarly, a2 will be blocked from updating d while a1 is updating d, until a1 finishes its writing and releases the lock.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for allowing consistent execution of a workflow process in a computer-enabled workflow management system, comprising
   (A) a workflow process database accessible by the workflow process, wherein the workflow process includes at least one sequence of workflow actions, having at least one set of parallel workflow actions and being configured as a plurality of nodes interconnected by arcs, each node defining at least one of the workflow actions and reading and writing data items when executing the workflow actions;

(B) a module that maintains execution consistency among the workflow actions when the nodes access the workflow process database to read and write the data items in carrying out the workflow actions while maintaining execution concurrency among the workflow actions, wherein the module further comprises
  (I) a first sub-module that locks a data item in the database when the data item is to be read or updated by one of the nodes and is not locked by other nodes before the read or update operation is commenced, wherein the first sub-module causes the node to update the workflow process database with the data item if the data item was not previously updated by another node executing another action which has accessed the same action database of the workflow management system with a greater serialization order;
  (II) a second sub-module that releases the lock after the node has performed the read or update operation.

2. The system of claim 1, wherein the first sub-module waits until the lock becomes available if the data item is locked by other nodes.

3. The system of claim 1, wherein the first sub-module ignores the data item and does not cause the node to update the workflow process database with the data item if the data item was previously updated by another node executing another action which has accessed the same action database of the workflow management system with a greater serialization order.

4. A computer-implemented method for allowing consistent executing of a workflow process in a workflow management system, comprising
  (A) allowing each of a plurality of interconnected nodes of the workflow process to read and write data items to and from a workflow process database in carrying out workflow actions associated with the respective nodes of the workflow process, wherein the workflow actions include multiple workflow actions including at least one set of parallel actions;
  (B) maintaining the execution consistency among the workflow actions when the nodes access the workflow process database to read and write the data items in carrying out the workflow actions while maintaining execution concurrency among the workflow actions, wherein the step (B) further comprises the steps of
    (I) locking a data item in the database when the data item is to be read or updated by a node of the nodes before the read or update operation is commenced;
    (II) releasing the lock after the node has performed the read or update operation regarding the data item;
    (III) causing the node to update the workflow process database with the data item if the data item was either not previously updated or previously updated by another node executing another action which has accessed the same action database of the workflow management system with a smaller serialization order.

5. The method of claim 4, wherein the step (I) further comprises the step of waiting until the lock is available if the data item has been locked by other nodes.

6. The method of claim 4, wherein the step (I) further comprises the step of ignoring the data item if the data item was previously updated by another node executing another action which has accessed the same action database of the workflow management system with a greater serialization order.

7. A computer-implemented method for allowing consistent executing of a workflow process in a workflow management system, comprising
  (A) allowing each of a plurality of interconnected nodes of the workflow process to read and write data items to and from a workflow process database in carrying out workflow actions associated with the respective nodes of the workflow process, wherein the workflow actions include multiple workflow actions including at least one set of parallel actions;
  (B) maintaining the execution consistency among the workflow actions when the nodes access the workflow process database to read and write the data items in carrying out the workflow actions while maintaining execution concurrency among the workflow actions, wherein the step (B) further comprising the steps of
    (a) performing an atomic read operation to read all data items from the workflow process database for an associated action, wherein the data items are locked when being read and released from being locked after being read;
    (b) causing the associated action to be executed;
    (c) performing an atomic update operation to update the data items in the workflow process database, wherein the data items are locked when being updated and released from being locked after being updated, wherein the step (c) further comprises the step of not updating the data item if the data item was previously updated by another node executing another action which has accessed the same action database of the workflow management system with a greater serialization order.

8. The method of claim 7, wherein each of the steps (a) and (c) further comprises the step of waiting to lock the data item until the data item is available for locking.

* * * * *